(12) United States Patent
Rajagopalan

(10) Patent No.: US 9,521,223 B1
(45) Date of Patent: Dec. 13, 2016

(54) MOBILE DEVICE CASE AND METHOD FOR USE THEREWITH

(71) Applicant: SanDisk Technologies Inc., Plano, TX (US)

(72) Inventor: Sreeram Rajagopalan, Sunnyvale, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/925,786

(22) Filed: Oct. 28, 2015

Related U.S. Application Data

(60) Provisional application No. 62/245,149, filed on Oct. 22, 2015.

(51) Int. Cl.
| | |
|---|---|
| *H04B 5/00* | (2006.01) |
| *H04M 1/02* | (2006.01) |
| *H04B 1/3888* | (2015.01) |
| *H04W 12/08* | (2009.01) |
| *H04M 1/725* | (2006.01) |

(52) U.S. Cl.
CPC ......... *H04M 1/0262* (2013.01); *H04B 1/3888* (2013.01); *H04W 12/08* (2013.01); *H04B 5/0031* (2013.01); *H04M 1/72527* (2013.01); *H04M 2201/36* (2013.01); *H04M 2250/02* (2013.01)

(58) Field of Classification Search
CPC ....... H04B 5/00; H04B 5/0031; H04B 5/0062; H04B 1/3883; H04M 1/72522; H04M 1/7253; H04M 15/93; H04M 2250/02; H04M 2250/04

USPC ...... 455/41.1, 41.2, 41.3, 552.1, 557, 556.1, 455/419, 420
See application file for complete search history.

(56) References Cited

U.S. PATENT DOCUMENTS

| | | | |
|---|---|---|---|
| 6,674,358 B1* | 1/2004 | Tinsley | H04M 1/04 224/245 |
| 7,832,645 B2 | 11/2010 | Chen et al. | |
| 8,483,758 B2 | 7/2013 | Huang | |
| 8,521,956 B2 | 8/2013 | Della Pia et al. | |
| 8,864,019 B2 | 10/2014 | Hashimoto | |
| 9,374,788 B2* | 6/2016 | Singamsetti | H04W 52/0261 |
| 2004/0070499 A1* | 4/2004 | Sawinski | G08B 13/1409 340/568.1 |
| 2007/0008118 A1* | 1/2007 | Kassiedass | A45C 13/24 340/539.21 |

(Continued)

OTHER PUBLICATIONS

San-Disk Connect—Wireless Media Drive & Wireless Flash Drive, http://www.sandisk.com/products/wireless/, 1 page, printed Nov. 14, 2013.

(Continued)

*Primary Examiner* — Duc M Nguyen
(74) *Attorney, Agent, or Firm* — Brinks Gilson & Lione

(57) ABSTRACT

A mobile device case and method for use therewith are provided. In one embodiment, a mobile device case is provided with a controller configured to detect that the mobile device case was possibly removed from the mobile device and provide an indicator to a mobile device accordingly. In another embodiment, a mobile device is provided comprising a controller configured to send a request to a mobile device case for a listing of the stored in a memory of the mobile device case, receive the listing of data from the mobile device case, and categorize the data into different categories. Other embodiments are provided.

18 Claims, 9 Drawing Sheets

(56) References Cited

U.S. PATENT DOCUMENTS

| | | | | |
|---|---|---|---|---|
| 2007/0026906 | A1* | 2/2007 | Macfarlane | G08B 13/1481 |
| | | | | 455/575.1 |
| 2008/0293274 | A1 | 11/2008 | Milan | |
| 2009/0096413 | A1 | 4/2009 | Partovi et al. | |
| 2009/0152361 | A1 | 6/2009 | Narendra et al. | |
| 2009/0287636 | A1 | 11/2009 | Ren et al. | |
| 2010/0185786 | A1* | 7/2010 | Wood et al. | H04M 1/026 |
| | | | | 710/18 |
| 2011/0050164 | A1 | 3/2011 | Partovi et al. | |
| 2011/0063104 | A1* | 3/2011 | Idzik | H02J 7/0044 |
| | | | | 340/533 |
| 2011/0175461 | A1 | 7/2011 | Tinaphong | |
| 2011/0185098 | A1 | 7/2011 | Kim et al. | |
| 2011/0241607 | A1 | 10/2011 | Wiegers | |
| 2012/0196530 | A1* | 8/2012 | Moosavi | H04W 52/0251 |
| | | | | 455/41.1 |
| 2012/0287231 | A1 | 11/2012 | Ravi et al. | |
| 2013/0301522 | A1 | 11/2013 | Krishna et al. | |
| 2014/0113550 | A1* | 4/2014 | Li | H04L 67/06 |
| | | | | 455/41.1 |
| 2014/0273845 | A1* | 9/2014 | Russell | H04W 76/023 |
| | | | | 455/41.2 |
| 2014/0342663 | A1* | 11/2014 | Eaton | H04M 1/04 |
| | | | | 455/41.1 |
| 2014/0364055 | A1* | 12/2014 | Geris | H04W 4/008 |
| | | | | 455/41.1 |
| 2015/0280789 | A1* | 10/2015 | Hussain | H04B 5/0037 |
| | | | | 455/41.1 |

OTHER PUBLICATIONS iExpander—An Expansion Drive for your iPhone, http://www.kickstarter.com/projects/108290897/iexpander-an-expansion-device-for-your-iphone-4-an, 24 pages, printed Nov. 14, 2013.

Cooper, D., "D-Link's All in One Mobile Companion is Gonna Lighten the Load of Your Checked Baggage", http://www.engadget.com/2012/01/10/d-link-all-in-one-mobile-companion/&ie=UTF-8 &oe=UTF-8, Jan. 10, 2012, 6 pages.

"D-Link User Manual All-in-one Mobile Companion DIR-505", http://www.dlink.com/- /media/Consumer_Products/DIR/DIR %20505/Manual/DIR_505_Manual_US.pdf, Version 1.0, Mar. 29, 2012, D-Link Systems, Inc., 200 pages.

"SharePort Mobile Companion DIR-505", http://www.dlink.com/us/en/home-solutions/connect/portable-routers/dir-505-shareport-mobile-companion, D-Link Systems, Inc., printed Aug. 5, 2013, 15 pages.

Application as filed for U.S. Appl. No. 13/565,472 entitled, "Wireless Power Transfer", filed Aug. 2, 2012, 40 pages.

Application as filed for U.S. Appl. No. 14/134,679 entitled, "Mobile Device Peripheral", filed Dec. 19, 2013, 27 pages.

Office Action for U.S. Appl. No. 14/134,679 dated Jun. 18, 2015, 20 pages.

Office Action for U.S. Appl. No. 13/565,472 dated Nov. 5, 2015, 14 pages.

Office Action for U.S. Appl. No. 14/134,679 dated Jan. 12, 2016, 19 pages.

Office Action in U.S. Appl. No. 13/565,472 dated May 18, 2016, 13 pages.

Notice of Allowance in U.S. Appl. No. 14/134,679, dated Apr. 26, 2016, 7 pages.

Notice of Allowance in U.S. Appl. No. 13/565,472, dated Sep. 29, 2016, 8 pages.

Application as filed for U.S. Appl. No. 15/295,613 entitled, "Mobile Device With Unified Media-Centric User Interface", filed Oct. 17, 2016, 29 pages.

"Collections-Get Your Files Ordered", printed from the internet: http://neatbytes.com/solidexplorer/index.php/2015/06/12/collections-get-your-files-ordered/, on Oct. 3, 2016, 6 pages.

Screenshots of Astro File Manager, 1 page.

Screenshots of ES File Explore prior to Jun. 24, 2016, 1 page.

Screenshots of SanDisk Memory Zone prior to Jun. 24, 2016, 1 page.

* cited by examiner

MOBILE DEVICE CASE AND METHOD FOR USE THEREWITH

CROSS-REFERENCE TO RELATED APPLICATION

The application claims priority to U.S. provisional patent application No. 62/245,149, filed Oct. 22, 2015, which is hereby incorporated by reference herein in its entirety.

BACKGROUND

Smartphone users take about seven pictures a day, on average, using their phone cameras. This behavior has increased the demand for mobile storage. In many instances, once a user purchases a mobile device, he usually does not have the ability to add additional memory to it. For example, mobile devices, such as Apple's iPhone and iPad, do not have inputs for external memory cards to expand the memory capacity of the device, so the user is limited by the mobile device's native memory capacity. In such situations, a user may purchase an external, wireless storage device for external storage capability. Additionally, some users struggle to organize their content (e.g., pictures, videos, music) on their smartphones in a meaningful way. For example, some smartphones display content in a folder hierarchy and require users to navigate these folders and arrange their content on their own. This prevents such users from consuming content that they created and requires users to spend time categorizing the content for easy access later on.

DETAILED DESCRIPTION

Figure 1:
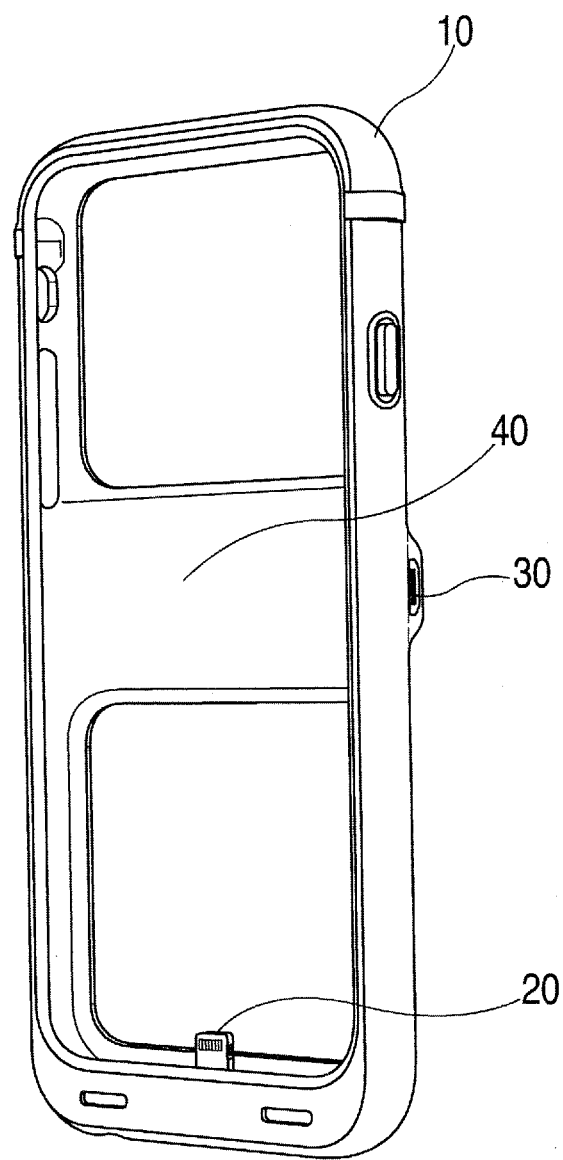
FIG. 1 is an illustration of a mobile device case of an embodiment.

By way of introduction, the below embodiments relate to a mobile device case and method for use therewith. In one embodiment, a mobile device case is provided comprising a housing shaped to cover at least some surfaces of a mobile device; an interface through which to communicate data between the mobile device and the mobile device case, wherein the interface is supported by the housing; and a storage device in communication with the interface and supported by the housing. The storage device comprises a memory and a controller. The controller is configured to detect whether the mobile device case was possibly removed from the mobile device; in response to detecting that the mobile device case was possibly removed from the mobile device, store an indicator indicating that the mobile device case was possibly removed from the mobile device; and provide the indicator to the mobile device.

In some embodiments, the controller is configured to detect that the mobile device case was possibly removed from the mobile device when the controller detects that mating connectors of the mobile device and mobile device case were disconnected.

In some embodiments, the controller is configured to detect that the mobile device case was possibly removed from the mobile device when the mobile computing device is powered down.

In some embodiments, the indicator is provided to the mobile device in response to a request from the mobile device or case.

In some embodiments, the memory stores data from the mobile device and/or data from a device other than the mobile device.

In some embodiments, the controller is further configured to provide information to the mobile device for the mobile device or case to index data stored in the memory.

In some embodiments, the memory device is embedded in the mobile device case.

In some embodiments, the mobile device case further comprises a detachable battery.

In some embodiments, the interface comprises a wireless transceiver.

In some embodiments, the memory comprises a three-dimensional memory.

In another embodiment, a mobile device is provided comprising an interface through which to communicate with a mobile device case and a controller. The controller is configured to send a request to the mobile device case for a listing of the data stored in a memory of the mobile device case; receive the listing of data from the mobile device case; and categorize the data into different categories.

In some embodiments, the request is sent to the mobile device case only if it is determined that the mobile device case was possibly removed from the mobile device.

In some embodiments, the data received from the mobile device case comprises different file extensions, and wherein the controller is configured to categorize the data based on the different file extensions.

In some embodiments, the controller is configured to perform the sending, receiving, and categorizing by executing an app.

In some embodiments, the app communicates with the mobile device case using an application program interface.

In some embodiments, the app comprises a media player that plays the data, such that the media player in the app plays the data instead of a native media player of the mobile device.

In some embodiments, a memory in the mobile device case stores data from the mobile device and/or data from a device other than the mobile device.

In some embodiments, a memory in the mobile device case comprises a three-dimensional memory.

Other embodiments are possible, and each of the embodiments can be used alone or together in combination.

Turning now to the drawings, FIG. 1 is an illustration of a mobile device case 10 of an embodiment. As shown in FIG. 1, the mobile device case 10 of this embodiment comprises a housing that carries a connector 20 to mate with a port on a mobile device (such as a mobile phone or tablet, for example), a port 30 (e.g., a microUSB port) to connect with an external connector (e.g., a cable to connect the case 10 to another computer device and/or a power source for charging the mobile device 50 and/or a detachable battery 60 (see FIG. 2A)), and an embedded storage device 40 (in other embodiments, the storage device 40 can be removable from the case 10).

Figure 2B:
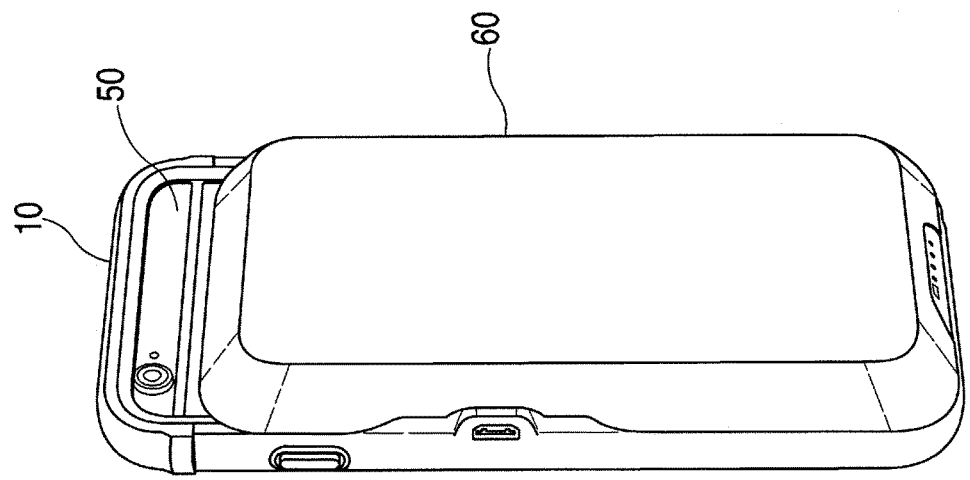
FIGS. 2A and 2B are illustrations of a mobile device case of an embodiment with a removable battery pack.
Figure 2A:
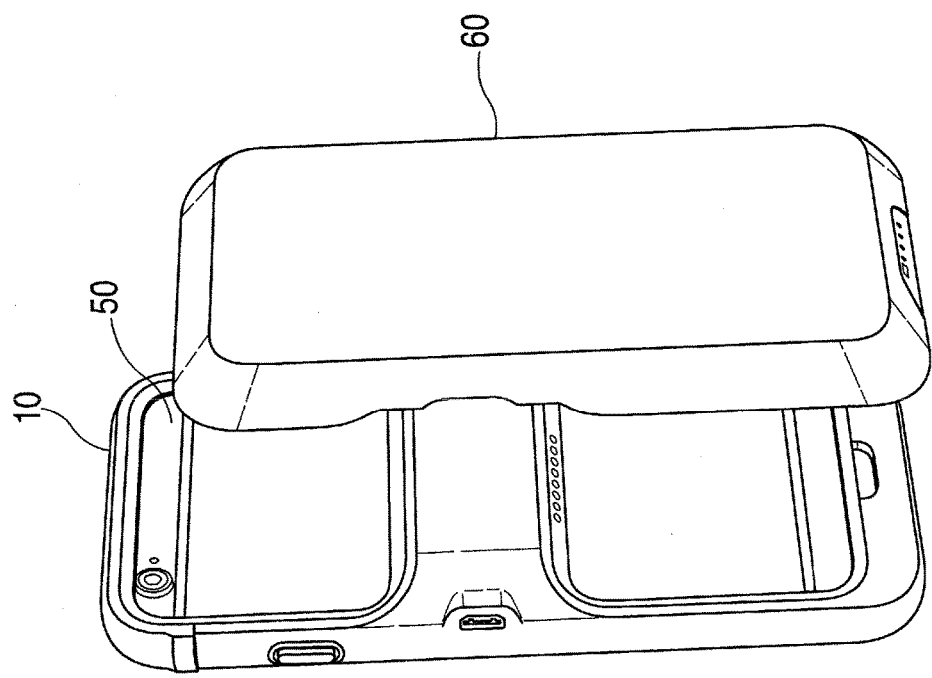

FIG. 2A shows the mobile device case 10 fitted over a mobile device 50 (here, a mobile phone). FIG. 2A also shows an optional detachable external battery 60 than can fit onto the case 10 (see FIG. 2B) and provide power to the storage device 40 and other component(s) of the case (and, optionally, to the mobile device 50).

Figure 3:
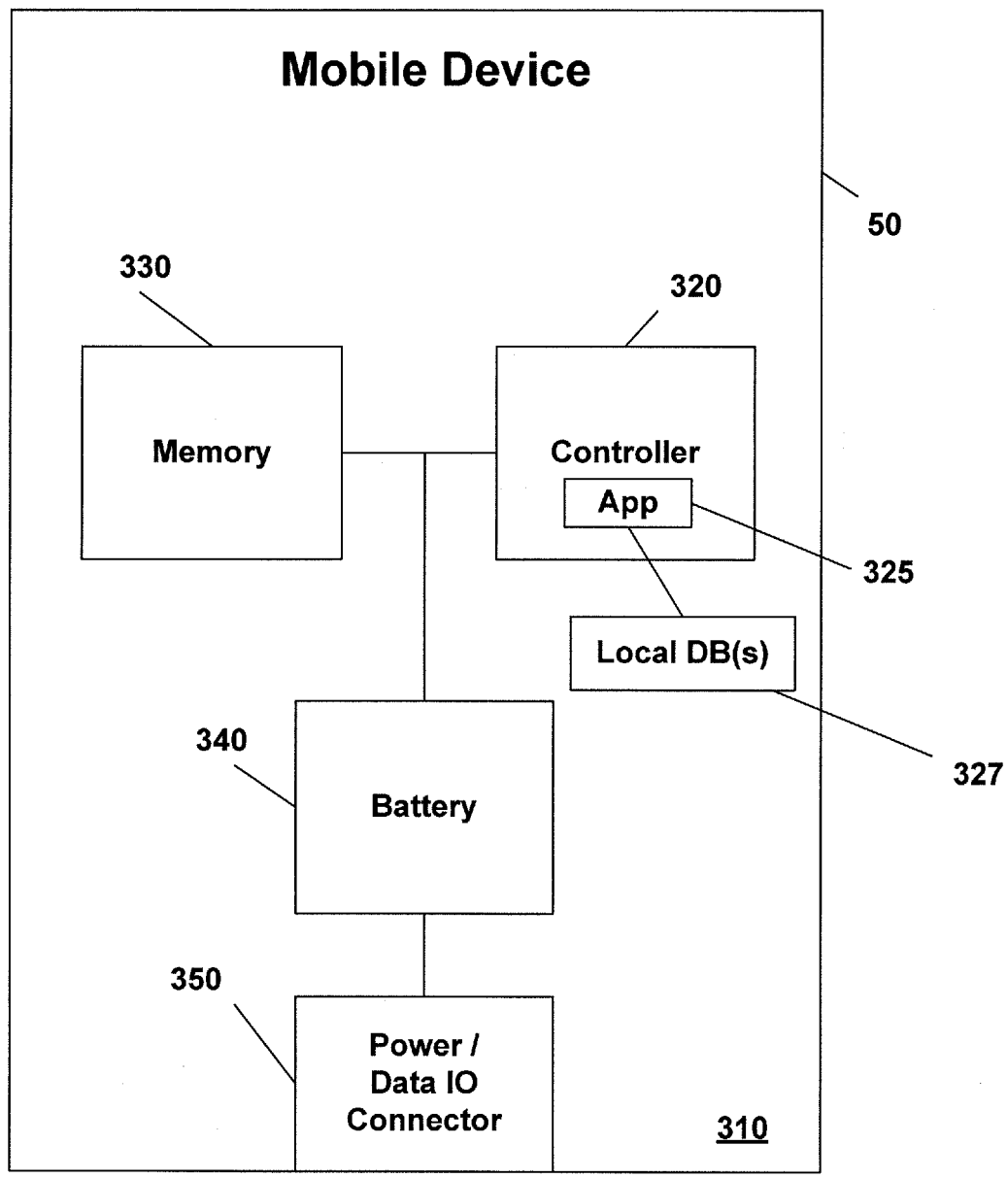
FIG. 3 is a block diagram of a mobile device of an embodiment.

FIG. 3 is a block diagram showing some exemplary components of the mobile device 50, which can be a computing device that is easily carryable by an average user. The mobile device 50 can take any suitable form, such as, but not limited to, a smart phone (e.g., an Apple iPhone, an Android phone), a tablet (e.g., an Apple iPad), a "phablet," a book reader (e.g., an Amazon Kindle), a digital media player (e.g., an iPod), a game device, a personal digital assistant (PDA), a laptop, a wearable computer (e.g., a smart watch or Google Glasses), and any other mobile device where access to additional memory may be desired. As shown in FIG. 3, the mobile device 50 in this embodiment comprises a housing 310, a controller 320 that runs one or more applications 325 (e.g., computer-readable program code executable by the controller 320) that communicates with one or more local databases 327, a battery 340, and a port for a power/data IO connector 350 (e.g., a Lightning connector). As used herein, a "power connector" or a "data connector" can convey power or data only, respectively, or both power and data.

The mobile device 50 can contain different or additional components, which are not shown in FIG. 3 to simplify the drawing. For example, if the mobile device 50 is a mobile smart phone, the mobile device 50 can include hardware and/or software components to make and place telephone calls. As another example, the mobile device 50 can contain other components, such as, but not limited to, a display device (which can be touch-sensitive) and an audio output device (e.g., a speaker or a headphone jack). Of course, these are just some examples, and other implementations can be used.

The housing of the mobile device case 10 can physically attach to the mobile device 50 is any suitable way and can depend on the design and type of the mobile device 50. For example, as shown in FIGS. 2A and 2B, the housing of the mobile device case 10 is configured to contact at least part of each of the surfaces of the mobile device 50. The case 10 can be in the form of a "rail" case, where the housing at least partially covers the side edges of the mobile device 50 and wraps around to grip the front and back portions of the mobile device 50. Alternatively, the case 10 can cover the back of the mobile device 50 or can cover both the back and front of the mobile device 50, with the front portion of the housing being at least partially removable (e.g., by flipping the front portion open) to expose the front of the mobile device 50 (e.g., to expose the mobile device's touch screen). In another embodiment, instead of being a "skin" that grips the mobile device 50, the case can contain an opening for the user to slide the mobile device 50 into the case. Other ways in which the housing of the mobile device case 10 can physically attach to the mobile device 50 include, but are not limited to, clipping the housing onto the mobile device 50 and using magnets, adhesive, Velcro, etc. to make the attachment.

Figure 4:
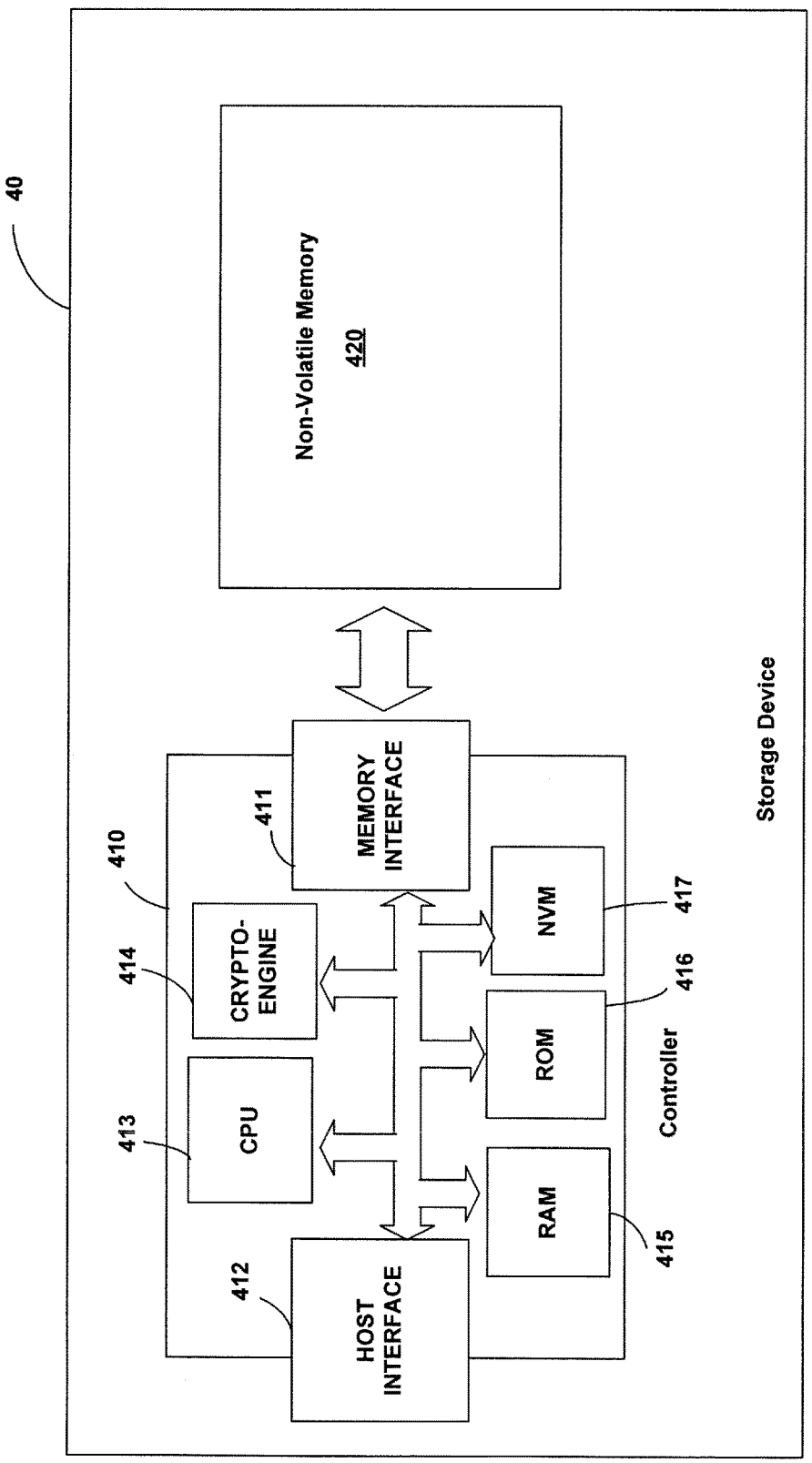
FIG. 4 is a block diagram of a storage device of an embodiment.

As mentioned above, in the embodiment, the case 10 contains a storage device 40, which can be, for example, a microSD card. FIG. 4 shows one exemplary storage device 40 in more detail. As shown in FIG. 4, the storage device 40 in one embodiment contains a controller 410 and non-volatile memory 420. In this embodiment, the controller 410 comprises a host interface 412 for placing the storage device 40 in communication with the mobile device 50, and a memory interface 411 for placing the controller 410 in communication with the memory 420. (As used herein, the phrase "in communication with" (or "operatively in communication with") could mean directly in communication with or indirectly in communication with through one or more components, which may or may not be shown or described herein.) The host interface 412 can take any suitable form, such as, but are not limited to, a SATA, SATA Express, SAS, Fibre Channel, USB, PCIe, and NVMe interface. The memory interface 411 can also take any suitable form, such as, but not limited to, a flash interface (e.g., Toggle Mode 200, 400, or 800).

The controller 410 also comprises a central processing unit (CPU) 413, an optional hardware crypto-engine 414 operative to provide encryption and/or decryption operations, read access memory (RAM) 415, read only memory (ROM) 416 which can store firmware for the basic operations of the storage device 440 and an application program interface, and a non-volatile memory (NVM) 417 which can store a device-specific key used for encryption/decryption operations, when used. The controller 410 can be implemented in any suitable manner. For example, the controller 410 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. Also, some of the components shown as being internal to the controller 410 can also be stored external to the controller 410, and other components can be used. For example, the RAM 415 (or an additional RAM unit) can be located outside of the controller die and used as a page buffer for data read from and/or to be written to the memory 420.

The non-volatile memory 420 can also take any suitable form. For example, in one embodiment, the non-volatile memory 420 takes the form of a solid-state (e.g., flash) memory and can be one-time programmable, few-time programmable, or many-time programmable. The non-volatile memory 420 can also use single-level cell (SLC) or multiple-level cell (MLC). The non-volatile memory 420 can take the form of NAND Flash memory or of other memory technologies, now known or later developed.

In this embodiment, the storage device 440 is embedded in the mobile device case 10. In alternate embodiments, the storage device 440 is removable from the mobile device case 10, such as when the storage device 440 takes the form of a removable memory card (e.g., an SD card or a microSD card).

The mobile device case 10 can have other components in addition to the storage device 40. For example, in one embodiment, the mobile device case 10 also has a wireless chip to allow the app 325 in the mobile device 50 to turn the case 10 on/off and/or to transfer data between the mobile device 50 and the storage device 40 without using the mobile device's connector 350. (In some embodiments, the mobile device case 10 can use the mobile device's transceiver to transfer data to the case 10 wirelessly from, e.g., a computer or other device.) In this way, the wireless transceiver allows wireless data transmission for data to be stored in or retrieved from the storage device 40. Any suitable wireless technology, now existing or later developed, can be used, including, but not limited to, 802.11 WiFi, near-field communication (NFC), Bluetooth (including Bluetooth Low Energy (LE), Nike+, ANT, ANT+, ZigBee, Radio Frequency for Consumer Electronics (RF4CE), and Infrared Data Association (IrDA). Also, it should be noted that, in some embodiments, the wireless memory capacity of the mobile device case 10 can be shared with other mobile devices (via a shared wireless network) even though the mobile device case 10 is physically attached to only one mobile device.

Figure 9:
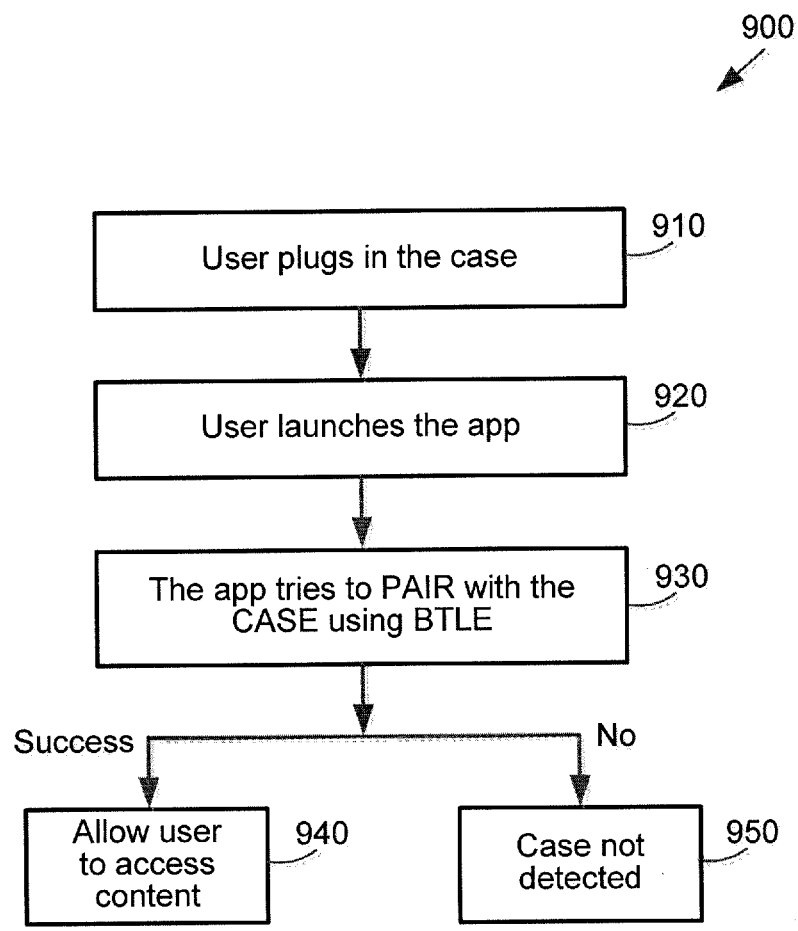
FIG. 9 is a flow chart of an embodiment for using a mobile device case of an embodiment.

FIG. 9 is a flow chart 900 that illustrates this process. After the user plugs in the case 10 (act 910) and launches the app 325 (act 920), the app 325 tries to pair with the case using, for example, a Bluetooth low energy (BTLE) connection (act 930). If the pairing is successful, the user is allowed access to the content in the case 10 (act 940). Otherwise, the case 10 will not be detected (act 950).

In some implementations, the app 325 and case 10 are "paired" to each other, so that the app 325 will only work with the case 10 (or other cases of a certain manufacturer). For example, the case 10 can have a hardware ID that is paired with the app 255. In one embodiment, the user downloads the app 225 onto his mobile device 50 to use the case 10 with his mobile device 50.

The following paragraphs will now discuss some exemplary uses of the app 325 and case 10. In one embodiment, the storage device 40 of the case 10 can provide additional storage capacity to the mobile device 50, and the app 325 on the mobile device 50 is configured to manage the storage and retrieval of the data to and from the storage device 40. Several examples of this will now be illustrated in conjunction with the block diagrams of FIGS. 5-7.

Figure 5:
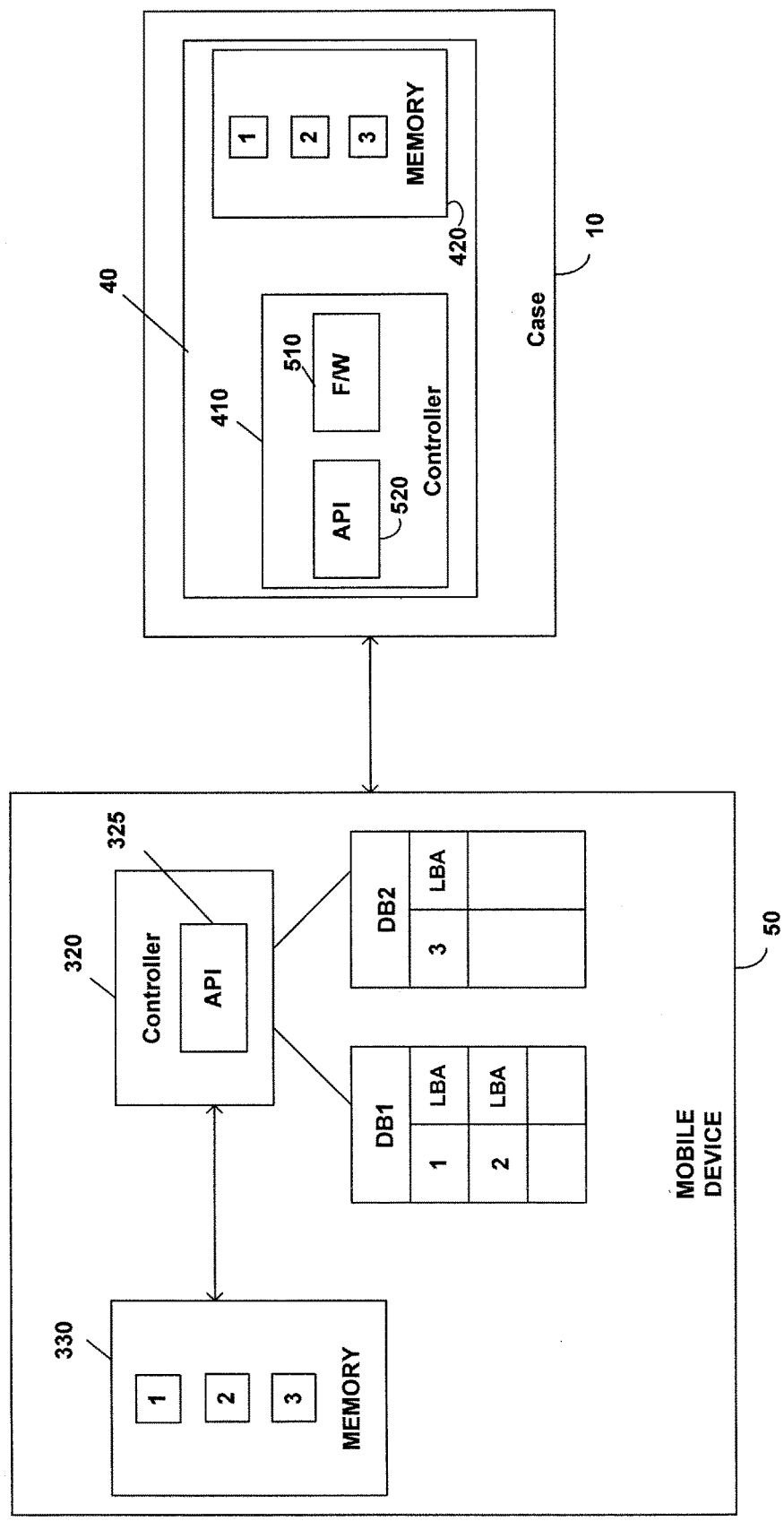
FIG. 5 is a block diagram of a mobile device and case of an embodiment.
Figure 6:
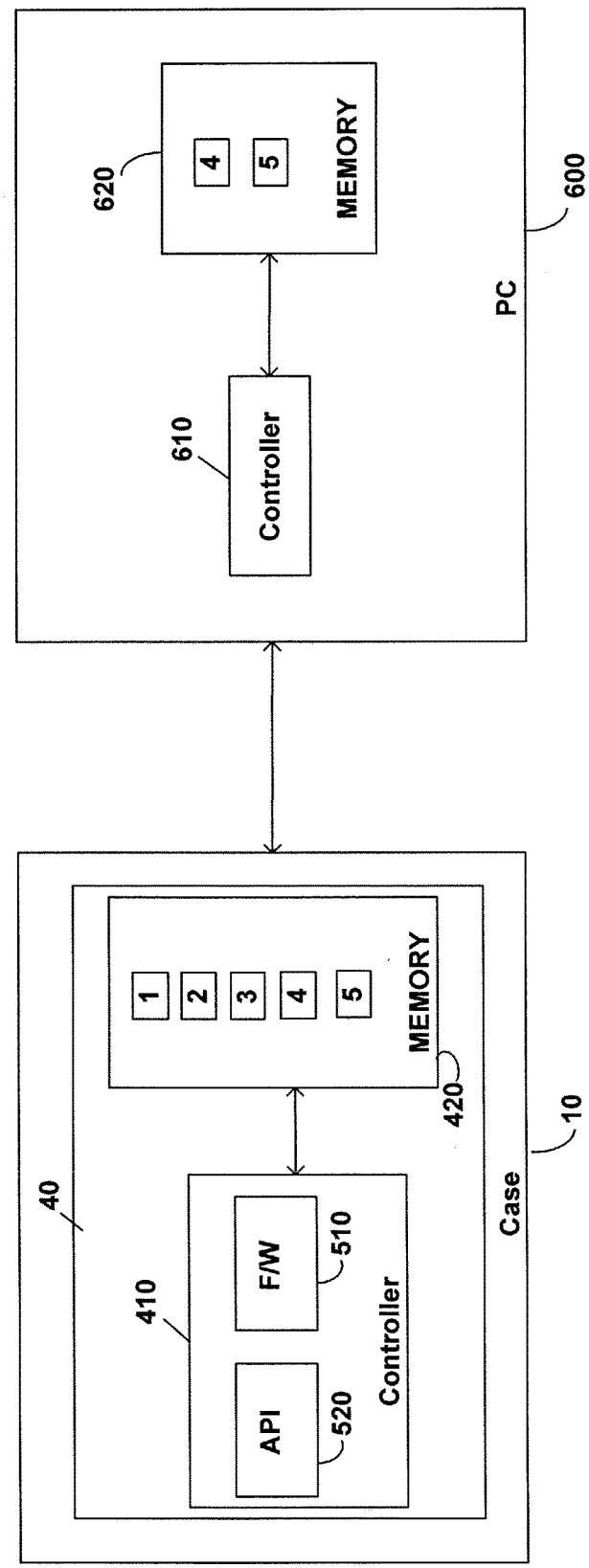
FIG. 6 is a block diagram of a case and computer of an embodiment.

FIG. 5 is a block diagram of the mobile device 50 and case 10. This diagram shows that the memory 330 of the mobile device 50 contains three content files: 1, 2, and 3. These files can take any suitable form, such as, but not limited to, a photo or video from the mobile device's "camera roll" or photos or videos that are taken with the mobile device 50 and directly saved to the case 10, an audio file from the mobile device's media player, and an email attachment or other data (e.g., a PDF file, an Excel, a Word document, etc.). These files can be the same type or different types (e.g., all photos, some photos and some videos, etc.). To store these files in the storage device 40 of the case 10, the user can interact with the app 325 to choose the files to be stored (e.g., via a graphical user interface that shows a list or thumbnails of the files and asks for a destination location), and the app 325 can send them to the storage device 40 in the case 10 for storage. In addition to or instead of the user manually selecting files to store, the app 325 can be configured to automatically store all or certain files (e.g., as an auto back-up feature or when the user launches the app 325 for the first time).

In this embodiment, the app 325 has one or more local databases to track the location of the files in the storage device 40 of the case 10. For example, in one embodiment, there are different databases for different file types (e.g., one database for photos, another database for videos, another database for audio files, etc.). In another embodiment, there is a single database, and the file types of the various files are noted in the database. Of course, other implementations are possible. In this example, there are two local databases. Database 1 is for photos, and database 2 is for videos. When the user interacts with the app 325 to store files 1-3 in the storage device 40 of the case 10, the app 325 stores the name and LBA address of files 1 and 2 in database 1, and the name and LBA address of file 3 database 2. The app 325 can know how to categorize the files based on their file extensions (e.g., .jpg files go in database 1, and .mp4 files go in database 2).

Figure 8:
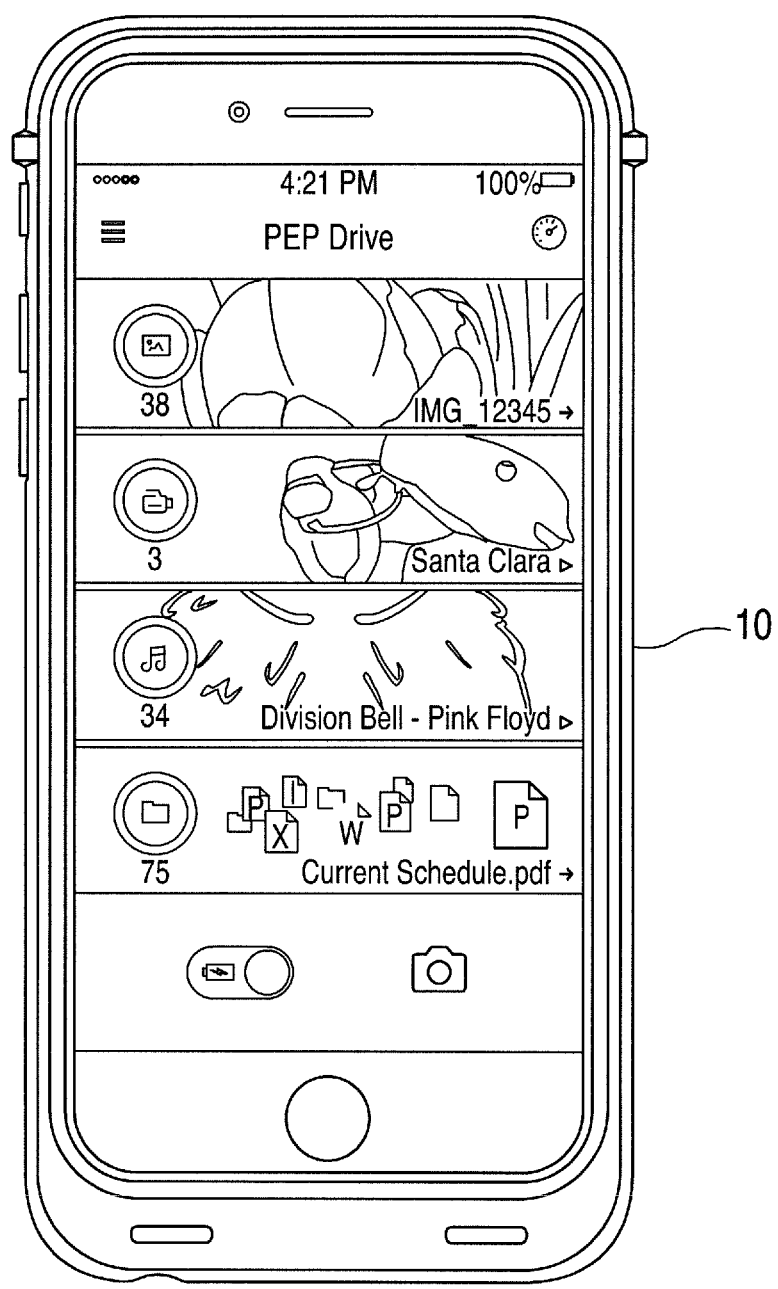
FIG. 8 is an illustration of a graphical user interface of an embodiment.

In this way, when the user later uses the app 325 to access content stored in the storage device 40 of the case 10, the app 325 can present a graphical user interface (see FIG. 8), in which the user can choose a category of content he is interested in. (There are four categories in FIG. 8 (photos, videos, music, and data attachments), although more or fewer categories can be used.) After the user selects a category, a listing of the files in that category can be displayed (based on the file names stored in the local database associated with that category). After the user selects a desired file, the app 325 sends a command to the storage device 40 in the case 10 to retrieve the file from the LBA address specified in the database.

As mentioned above, in this example, the app 325 is in control of storing data from the mobile device 40 to the storage device 40 in the case 10. The app 325 categorizes the data (e.g., based on file extension type) and stores the file name and location in local databases, so the app 325 will be able to present categories of content to the user for selection and will know where to find selected content in the storage device 40 of the case 10. However, in some embodiments, it is possible for data to be stored in the storage device 40 of the case 10 without using the app 325. For example, as shown in FIG. 1, in some embodiments, the case 10 has a power for connecting the case to another computer device (e.g., a PC) when the case 10 is removed from the mobile computing device 50. In this situation (shown in FIG. 6), the user may transfer files from that other computing device to the storage device 40 in the case (here, files 4 and 5). Since the app 325 was not involved in this file transfer, it will not know that the file transfer will occur and its local database will not have a record of these files. As such, these files will not appear in the graphical user interface for user selection. The same problem can occur when a user moves or deletes a file initially stored by the app 325.

Figure 7:
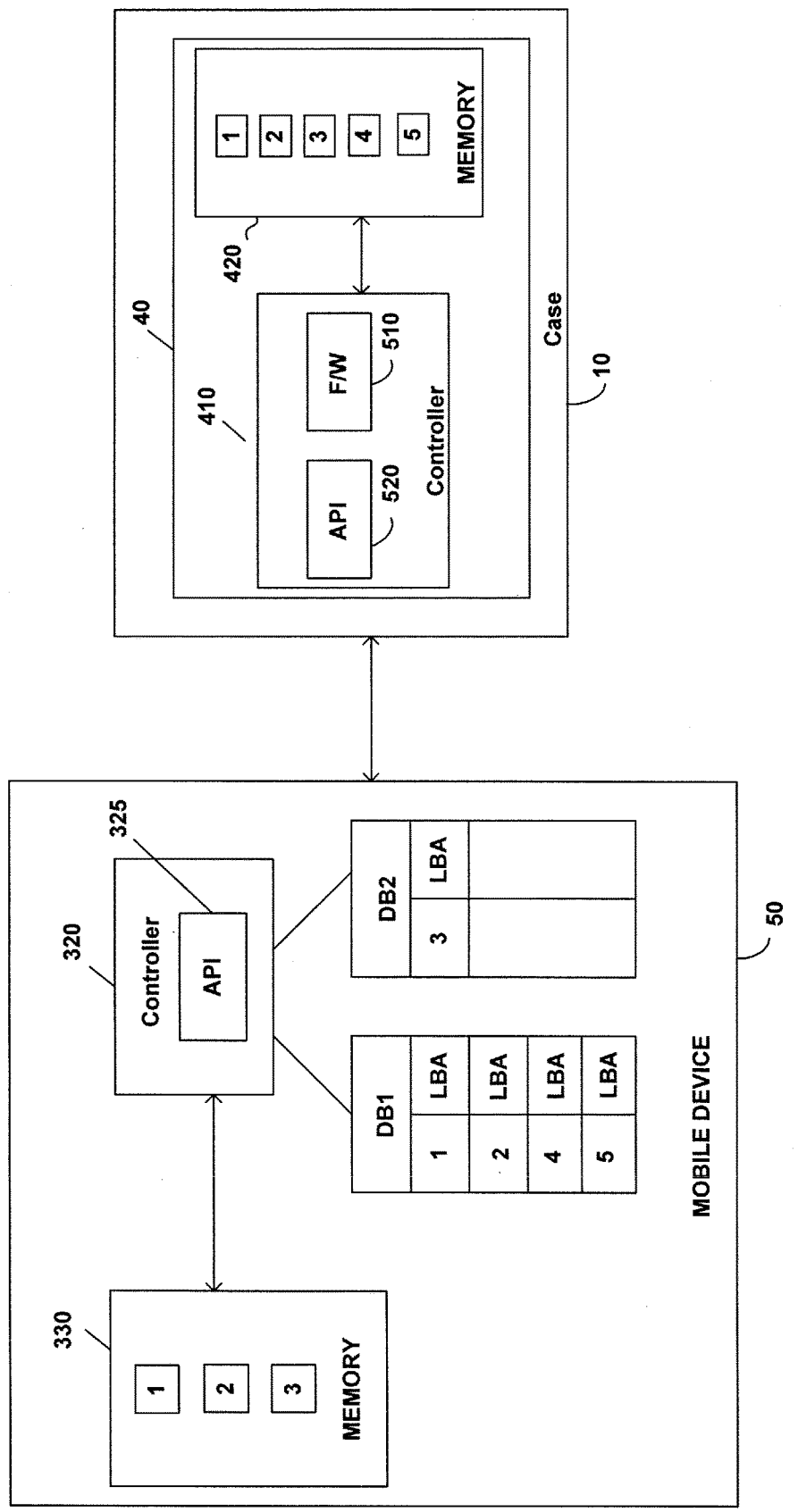
FIG. 7 is a block diagram of a mobile device and case of an embodiment.

To address this situation, the app 325 can index all of the files in the storage device 40 in the case 10 to ensure that all the files are represented in the local databases (see FIG. 7). For example, every time that the app 325 and/or case 10 is powered up, the app 325 can send queries to the storage device 40 for a listing and locations of contents of different file types. In this way, the app 325 can build the index "from scratch" every time to ensure that its databases are up to date. However, rebuilding databases every time the app 325 and/or case 10 is powered up can be a very time-consuming process, especially if there are a lot of files stored in the storage device 40. Also, if files were not added, deleted, or modified, the local databases would be up-to-date, and the re-indexing would not be necessary.

To overcome this problem, in one embodiment, the app 325 only indexes the files stored in the storage device 40 of the case 10 when the app 325 knows that the case 10 was removed from the mobile device 50. In this example, files can only be added to the storage device 40 in the case 10 without the app 325 knowing it when the case 10 is removed from the mobile device 50. (The app 325 can also do indexing when it detects that the case 10 is being connected to the mobile device 50 for the first time.) To do this, the firmware 510 in the controller 410 of the storage device 40 can monitor when the connector 20 of the case 10 is disconnected from the mobile device 50. When this occurs, the firmware 510 can store a flag in the storage device 40. Later, when the app 325 is executed, the app 325 can send a query to an application program interface (API) 520 in the storage device 40 in the case 10 asking whether or not the case 10 was disconnected (or reconnected). In response to the query, the API 520 would return the flag. If the flag indicates that the case 10 was disconnected from the mobile device 50, the app 320 can re-index the files stored in the storage device 40 in the case 10. Otherwise, if the flag indicates that the case 10 was not disconnected from the mobile device 50, the app 320 would not re-index the files, thereby avoiding a needless, time-consuming process that would degrade the user's experience and allowing the user to access content more quickly.

There are several advantages associated with these embodiments. The GUI design discussed above automatically categorizes the user's content on the storage device of the case 10 into different categories (e.g., photos, videos, music, and other files) based on file type extensions. This provides the advantage of helping users get to their content quicker than sorting through folders. Users can swipe on each of these content categories (photos, videos, etc.) and access their most-recent content. This makes it even quicker for a user who was watching a movie or listening to a song and stopped it midway. In one embodiment, tapping on bold icons can take them to more-detailed listing of all their contents (by type). Also, the API for indexing discussed above allows the app GUI to know when it needs to index. Indexing is a computational and time-intensive task, and, in this embodiment, the app 325 does not index all the content all the time, as it only indexes when content is added, deleted, moved, or copied from the storage device 40. When users use the app 325 to transfer their content (e.g., photos and videos) from their mobile device 50 to the storage device 40 in the case 10, the app 325 facilitates this transaction and therefore knows how to index this transaction, as it knows the destination of the content during the operation. However, the app 325 will not know if the user unplugs the case 10 from the mobile device 50 and connects the case 10 to a computer and transfers content to the storage device 40 in the case 10 using the computer's USB port. To account for this, the API in the case 10 can indicate to the app 325 when the case 10 was unplugged from the mobile device 50. Whenever this event is triggered, it indicates to the app 325 that there is possibly a change in the storage device's content and, therefore, that there is a need to re-index the storage device 40. By having this selective indexing, the app 325 can provide a superior user experience. Also, in one embodiment, while indexing, the app 325 can allow the user to perform other tasks.

In this way, there embodiments provide a mobile application graphical user interface to organize and to surface user contents on an external storage device. The graphical user interface can automatically and intelligently index the content of an external storage device into categories such as photos, videos, music, etc., so that users do not have to categorize them manually. Furthermore, since indexing content on large volumes of data can be time and computationally intensive, these embodiments provide a mechanism for taking into account when the external memory device is disconnected from the mobile device, so as to only index when new content is added to the memory device. This overcomes the problems associate with prior approaches. Many mobile applications do not adequately solve this challenge, as some applications do not value good user experience. There are a few other applications that do not remember the previous state of the mobile device and therefore index the entire content of a phone whenever the user launches the application. Depending on the amount of data on the phone, indexing can take anywhere between 1-60 seconds every time the application is launched. This again leads to poor user experience.

There are many alternatives that can be used with these embodiments. For example, in the above embodiments, the storage device 40 took the form of a memory card, and an external wireless transceiver was used. In an alternate embodiment, the storage device 40 is provided with its own wireless transceiver. Accordingly, a seperate wireless technology chip in the case 10 is not needed. One example of a removable storage device with its own wireless transceiver is an Eye-Fi SD card.

In another alternative, instead of taking the form of a case, these embodiments can be implemented in another type of mobile device peripheral. Such a mobile device peripheral does not necessary need to provide any protection to the mobile device, as it is designed primarily to be a physical attachment to the mobile device and not a protective case. To make the physical attachment, the output port of the mobile device peripheral can physically attach to the mobile device's power/data connector input. So, instead of physically contacting at least part of each of the surfaces of the mobile device, the mobile device peripheral in this alternative can contact only one surface of the mobile device (e.g., the bottom surface). Other types of mobile device peripheral housing configurations can be used with other forms of mobile devices. For example, when the mobile device is a wearable computer, such as wearable glasses or a watch, the housing can take the form of a nose pad or a watch bezel protector, respectively. Also, in other embodiments, the mobile device peripheral does not necessarily need to physically contact the mobile device, such as when the mobile device peripheral is remotely located and communicates via a wireless connection.

Finally, as mentioned above, any suitable type of memory can be used. Semiconductor storage devices include volatile storage devices, such as dynamic random access memory ("DRAM") or static random access memory ("SRAM") devices, non-volatile storage devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of storage device may have different configurations. For example, flash storage devices may be configured in a NAND or a NOR configuration.

The storage devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash storage device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash storage devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single storage device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single storage device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple storage device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional storage device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) storage device levels. Alternatively, the memory elements may be coupled together to form a vertical NAND string that traverses across multiple horizontal storage device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more storage device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each storage device level of the array are typically formed on the layers of the underlying storage device levels of the array. However, layers of adjacent storage device levels of a monolithic three dimensional memory array may be shared or have intervening layers between storage device levels.

Then again, two dimensional arrays may be formed separately and then packaged together to form a non-monolithic storage device having multiple layers of memory. For example, non-monolithic stacked memories can be constructed by forming memory levels on separate substrates and then stacking the memory levels atop each other. The substrates may be thinned or removed from the storage device levels before stacking, but as the storage device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip storage device.

Associated circuitry is typically required for operation of the memory elements and for communication with the memory elements. As non-limiting examples, storage devices may have circuitry used for controlling and driving memory elements to accomplish functions such as programming and reading This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A mobile device case comprising:
 a housing shaped to cover at least some surfaces of a mobile device;
 an interface through which to communicate data between the mobile device and the mobile device case, wherein the interface is supported by the housing; and
 a storage device in communication with the interface and supported by the housing, wherein the storage device comprises:
  a memory; and
  a controller in communication with the memory, wherein the controller is configured to:
   detect whether the mobile device case was possibly removed from the mobile device;
   in response to detecting that the mobile device case was possibly removed from the mobile device, store an indicator indicating that the mobile device case was possibly removed from the mobile device; and provide the indicator to the mobile device, wherein the mobile device is configured to send a request to the mobile device case for a listing of data stored in the memory of the mobile device case only if the memory device is provided with the indicator from the mobile device case indicating that the mobile device case was possibly removed from the mobile device.

2. The mobile device case of claim 1, wherein the controller is configured to detect that the mobile device case was possibly removed from the mobile device when the controller detects that mating connectors of the mobile device and mobile device case were disconnected.

3. The mobile device case of claim 1, wherein the controller is configured to detect that the mobile device case was possibly removed from the mobile device when the mobile device is powered down.

4. The mobile device case of claim 1, wherein the indicator is provided to the mobile device in response to a request from the mobile device.

5. The mobile device case of claim 1, wherein the memory stores data from the mobile device and/or data from a device other than the mobile device.

6. The mobile device case of claim 1, wherein the controller is further configured to provide information to the mobile device for the mobile device to index data stored in the memory.

7. The mobile device case of claim 1, wherein the memory device is embedded in the mobile device case.

8. The mobile device case of claim 1 further comprising a detachable battery.

9. The mobile device case of claim 1, wherein the interface comprises a wireless transceiver.

10. The mobile device case of claim 1, wherein the memory comprises a three-dimensional memory.

11. A mobile device comprising:
an interface through which to communicate with a mobile device case; and
a controller in communication with the interface, wherein the controller is configured to:
send a request to the mobile device case for a listing of the data stored in a memory of the mobile device case, wherein the request is sent to the mobile device case only if it is determined that the mobile device case was possibly removed from the mobile device;
receive the listing of data from the mobile device case; and
categorize the data into different categories.

12. The mobile device of claim 11, wherein the data received from the mobile device case comprises different file extensions, and wherein the controller is configured to categorize the data based on the different file extensions.

13. The mobile device of claim 11, wherein the controller is configured to perform the sending, receiving, and categorizing by executing an app.

14. The mobile device of claim 13, wherein the app communicates with the mobile device case using an application program interface.

15. The mobile device of claim 13, wherein the app comprises a media player that plays the data, such that the media player in the app plays the data instead of a native media player of the mobile device.

16. The mobile device of claim 11, wherein a memory in the mobile device case stores data from the mobile device and/or data from a device other than the mobile device.

17. The mobile device of claim 11, wherein a memory in the mobile device case comprises a three-dimensional memory.

18. A mobile device comprising:
an interface through which to communicate with a mobile device case;
means for sending a request to the mobile device case for a listing of the data stored in a memory of the mobile device case, wherein the request is sent to the mobile device case only if it is determined that the mobile device case was possibly removed from the mobile device;
means for receiving the listing of data from the mobile device case; and
means for categorizing the data into different categories.

* * * * *